United States Patent
Broeker et al.

(10) Patent No.: US 11,041,522 B2
(45) Date of Patent: Jun. 22, 2021

(54) JOINT FOR A VEHICLE AND METHOD FOR PRODUCING SUCH A JOINT

(71) Applicant: ZF Friedrichshafen AG, Friedrichshafen (DE)

(72) Inventors: Klaus Broeker, Bohmte (DE); Monnic Hoenke, Uchte (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 223 days.

(21) Appl. No.: 16/348,646

(22) PCT Filed: Nov. 15, 2017

(86) PCT No.: PCT/EP2017/079259
§ 371 (c)(1),
(2) Date: May 9, 2019

(87) PCT Pub. No.: WO2018/108418
PCT Pub. Date: Jun. 21, 2018

(65) Prior Publication Data
US 2019/0293111 A1     Sep. 26, 2019

(30) Foreign Application Priority Data

Dec. 15, 2016 (DE) ...................... 10 2016 225 127.9

(51) Int. Cl.
*F16C 11/06*     (2006.01)
*B60G 7/00*      (2006.01)

(52) U.S. Cl.
CPC ........ *F16C 11/0614* (2013.01); *F16C 11/069* (2013.01); *B60G 7/005* (2013.01);
(Continued)

(58) Field of Classification Search
CPC .......... F16C 11/04; F16C 11/069; F16C 1/14; F16C 1/108; F16C 1/223
See application file for complete search history.

(56) References Cited

U.S. PATENT DOCUMENTS

| 4,714,368 A | 12/1987 | Sawada et al. |
| 5,230,580 A | 7/1993 | Henkel |

(Continued)

FOREIGN PATENT DOCUMENTS

| DE | 10 2012 207 527 A1 | 11/2013 |
| WO | 2006/056171 A1 | 6/2006 |

OTHER PUBLICATIONS

German Office Action Corresponding to 10 2016 225 127.9 dated Aug. 7, 2018.

(Continued)

*Primary Examiner* — Daniel J Wiley
(74) *Attorney, Agent, or Firm* — Finch & Maloney, PLLC; Michael J. Bujold (57) ABSTRACT

A joint for a vehicle, the joint having an outer sleeve, a joint shell for receiving a movably supported joint inner portion, and an inner sleeve, at least part of which is arranged between the joint shell and the outer sleeve. The inner sleeve has two radially outwardly projecting rim cylinders which are axially mutually spaced and run around the outer periphery of the inner sleeve, and the two rim cylinders define a peripheral recess on the outer periphery of the inner sleeve. The joint is characterized in that a press-fit device designed integrally with the inner sleeve extends in the region of at least one rim cylinder of the inner sleeve radially outwards beyond the outer diameter of the rim cylinder.

15 Claims, 8 Drawing Sheets

(52) U.S. Cl.
CPC .... *B60G 2204/416* (2013.01); *B60G 2204/44* (2013.01); *B60G 2206/82092* (2013.01); *F16C 2326/01* (2013.01); *F16C 2326/05* (2013.01); *F16C 2326/20* (2013.01)

(56) References Cited

U.S. PATENT DOCUMENTS

| | | |
|---|---|---|
| 9,541,123 B2 | 1/2017 | Broeker et al. |
| 2006/0098908 A1 | 5/2006 | Clarke et al. |
| 2009/0060633 A1* | 3/2009 | Broker .................... F16C 23/04 403/2 |
| 2010/0054851 A1 | 3/2010 | Bohne et al. |

OTHER PUBLICATIONS

International Search Corresponding to PCT/EP2017/079259 dated Feb. 5, 2018.
Written Opinion Corresponding to PCT/EP2017/079259 dated Feb. 5, 2018.

\* cited by examiner

JOINT FOR A VEHICLE AND METHOD FOR PRODUCING SUCH A JOINT

This application is a National Stage completion of PCT/EP2017/079259 filed Nov. 15, 2017, which claims priority from German patent application serial no. 10 2016 225 127.9 filed Dec. 15, 2016.

FIELD OF THE INVENTION

The invention relates to a joint for a vehicle, having an outer sleeve, a joint socket for receiving an inner part of the joint that is fitted so that it can move, an inner sleeve arranged at least partially between the joint socket and the outer sleeve, wherein the inner sleeve has two rim cylinders axially a distance apart from one another which extend around the outer periphery of the inner sleeve and project radially outward, and the two rim cylinders define an all-round recess at the outer periphery of the inner sleeve. In addition the invention relates to a method for producing a joint in which an inner sleeve is fitted into an outer sleeve, a joint socket is arranged in the inner sleeve, an inner part of the joint is fitted into the joint socket so that it can move, and in which a locking ring is pressed into the outer sleeve in order at least partially to expand the outer sleeve radially.

BACKGROUND OF THE INVENTION

Such a joint and such a method are known from DE 10 2012 207 527 A1 According to this the joint is in the form of a sleeve joint which comprises an outer sleeve extending in an axial direction and two locking rings arranged in the outer sleeve. In the outer sleeve and in the axial direction between the two locking rings is arranged an inner sleeve in which a ball socket for receiving a ball sleeve which is fitted so that it can move in the ball socket. The inner sleeve has two rims that project radially outward, designed as rim cylinders, such that between the inner sleeve and the outer sleeve there is an all-round free space in the form of a recess or groove.

Joints, in particular press-in joints, sleeve couplings and/or pivot joints, can be combined in various forms with a vehicle component and/or pressed into a vehicle component. However, owing to the pressing of the joint or its outer sleeve into a bearing eye there can be a conflict of aims. On the one hand, the pressing-in force must have a minimum value in order to ensure a sufficiently firm seating of the joint in the bearing eye. In particular, the pressing-in force is determined by the pressing-in overlap of the outer sleeve diameter and the bearing eye diameter, and by the friction values. The firm seating is usually predetermined by defined minimum press-out forces or dynamic loads. However, there is a risk that by virtue of the pressing-in overlap the outer diameter will be reduced to the extent that the movement resistance torque of the joint increases. A change of the movement resistance torque due to the pressing of the joint into a bearing eye is often undesired and can affect the adjustment of the chassis adversely.

According to the known prior art this conflict of aims can be resolved by a suitable design of the inner sleeve. In such a case, by means of the inner sleeve the joint socket can be protected against the effects of a diameter reduction of the outer sleeve, at least in a specified circumferential range. In particular, the joint socket is seated in the outer sleeve with the inner sleeve interposed. By virtue of the inner sleeve the joint can be pressed into a bearing eye of a vehicle component without changing a radial stress that is acting on the joint socket, or at least not changing it too much. The frictional torque produced or set during the production of the joint remains unchanged or is influenced only slightly or negligibly.

In the known prior art, due to the pressing of the two locking rings in the area of the two rim cylinders, air gaps are produced between the inner sleeve and the outer sleeve. Owing to the pressing of the joint into a bearing eye of a vehicle component, these air gaps are closed. The embodiments according to the document DE 10 2012 207 527 A1 are limited to sleeve joints which are symmetrical relative to an axis of symmetry arranged perpendicularly to the axial axis. In particular, two locking rings are pressed into end areas of the outer sleeve a distance apart from one another in the axial direction. Usually, joints of this type have no axial locking ring. Thus, as a rule such joints can only be loaded radially. In particular dynamic loading of the locking rings are avoided, since otherwise wear of the joint and/or leaks can occur.

However, in the event that high axial loads should be withstood by the joint, embodiments perpendicular to the axial axis of the joint and of unsymmetrical design can be used. In that case, however, it is disadvantageous that two locking rings can no longer be used so that no air gap or free space extending around the full length of the inner sleeve with a view to pressing the joint into a bearing eye can be provided.

SUMMARY OF THE INVENTION

The purpose of the present invention is to develop further a joint and a method of the type mentioned at the start in such manner that pressing of the joint into a bearing eye has no, or at best only a small effect on the movement resistance torque of the joint. Preferably, the joint has a preferred axial direction for withstanding an axial load. In particular, an alternative design fore should be provided.

The objective on which the invention is based is achieved by a joint and a method according to the independent claims. Preferred further developments of the invention emerge from the subordinate claims and from the description that follows.

According to these, the joint for a vehicle comprises an outer sleeve, a joint socket for holding an inner joint component fitted so that it can move, and an inner sleeve arranged at least in part between the joint socket and the outer sleeve. The inner sleeve has two rim cylinders axially a distance apart from one another and running all the way round the outer circumference of the inner sleeve, which extend or project radially outward, and the rim cylinders form or delimit an all-round recess, in particular a groove, on the outer circumference of the inner sleeve. Furthermore, a press-fitting device formed integrally with the inner sleeve extends radially outward in the area of at least one rim cylinder of the inner sleeve, beyond the outer diameter of the rim cylinder.

Here, it is advantageous that the press-fitting device, formed integrally and preferably in one piece with the inner sleeve, can adopt the function in particular of a further or second locking ring. Thus, in the area of the rim cylinder of the inner sleeve with the integral press-fitting device there is no need for a separate locking ring or cover-plate. Preferably, the joint has only one locking ring or cover-plate as a separate component. This increases the diversity of possible designs. In particular, a joint or press-in joint with a preferred axial direction for withstanding large axial loads can be made.

Preferably, the joint has a joint axis and/or axial axis around which the joint, the outer sleeve and/or the inner joint component can move. Preferably, the joint axis extends in the axial direction of the outer sleeve. The joint axis and the axial axis of the outer sleeve can coincide. In particular, the outer sleeve and/or the inner sleeve extend in the axial direction of the joint and/or in the axial direction of the joint axis. Preferably, the joint axis is a longitudinal central axis of the joint. In particular, relative to the joint axis, the axial axis and/or the longitudinal central axis, the joint is made rotationally symmetrical or essentially rotationally symmetrical. The joint axis, the axial axis and/or the longitudinal central axis of the joint can pass through the in particular ball-like or ball-shaped inner joint component.

In the context of the present application the expression "radial" can denote any direction which is perpendicular to the axial direction of the joint, the joint axis, the axial axis and/or the longitudinal central axis. The outer sleeve, the inner sleeve and/or the joint socket can form a joint housing or can be part of a joint housing. In particular, the inner joint component is fitted into the joint socket so that it can rotate and/or pivot. Preferably, a rim cylinder is understood to mean an edge of the inner sleeve that projects radially outward. In particular, the two rim cylinders define and/or determine the two axial ends of the inner sleeve a distance apart from one another. The rim cylinders can be ring-like and/or ring-shaped.

According to a further embodiment, starting at the rim cylinder, in particular the outer circumferential surface of the rim cylinder, the press-fitting device extends radially outward. If the inner sleeve is press-fitted into the outer sleeve, the press-fitting device rests in contact with the outer sleeve. Starting from the outer circumference and/or the outer circumferential surface of the rim cylinder, the press-fitting device can extend radially outward in the direction of an inside of the outer sleeve. In particular, in the area of the press-fitting device the outer diameter of the inner sleeve is greatest. Preferably, and particularly when the inner sleeve has not yet been fitted into the outer sleeve, the outer diameter of the inner sleeve is larger than the inside diameter of the outer sleeve. The inner sleeve can then be press-fitted into the outer sleeve.

In particular, at least one all-round free space and preferably two all-round free spaces can be formed between the inner sleeve and the outer sleeve. Apart from the exception due to the press-fitting device, the free space or spaces can extend essentially over the length of the inner sleeve, in particular over its full length. Preferably, the free space and in particular the two free spaces is/are formed in an assembled condition of the joint and in relation to a condition before fitting into a chassis component. In particular, at least two free spaces and/or gaps are separated from one another by the press-fitting device. The length of the inner sleeve is preferably its length in the axial direction. Owing to the at least one free space and/or gap, as far as the press-fitting device the inner sleeve is not in contact with the outer sleeve, particularly in the radial direction. Thus, the inner sleeve can be arranged in the outer sleeve in such manner that only the press-fitting device is in contact with the inside of the outer sleeve. Accordingly, the joint can be pressed into a bearing eye of a vehicle component with a reduction of its diameter without that diameter reduction having any, or any considerable influence on the joint socket and/or the bearing. Preferably, particularly when the joint is press-fitted into a bearing eye, the diameter of the outer sleeve can be reduced by decreasing the radial dimensions of the free space, in particular without influencing the joint socket. This can take place until the free space and/or gap has been reduced to the point when the outer sleeve comes into contact with the inner sleeve, especially in the area of the rim cylinder. Only after that can a further diameter reduction of the outer sleeve result in a diameter reduction of the inner sleeve and therefore influence the joint socket. Preferably, the at least one free space is in the form of a gap.

According to a further development, a locking ring or cover-plate is arranged inside the outer sleeve. In that way the press-fitting device can be associated with the edge cylinder on the side remote from the locking ring or cover-plate. In that way the press-fitting device can act as an additional or second locking ring or cover-plate. Preferably, the press-fitting device is ring-shaped.

The locking ring, the cover-plate and/or the press-fitting device can be stressed in the radial direction of the outer sleeve on and/or radially against the outer sleeve. In particular, the locking ring, the cover-plate and/or the press-fitting device is pressed into the outer sleeve. At least part of the forces occurring when the diameter of the outer sleeve is reduced can be taken up in the locking ring, the cover-plate and/or the press-fitting device. The locking ring, the cover-plate and the press-fitting device, the inner sleeve and/or the outer sleeve can be made of metal, in particular steel. The locking ring, the cover-plate and the press-fitting device can have the same outer diameter. At the locking ring and/or the end of the inner sleeve remote from the locking ring or cover-plate, in each case a sealing bellows can be fitted. The sealing bellows can extend as far as the inner joint component and form a seal against it.

In a further embodiment the press-fitting device is in the form of a lip projecting radially outward, in particular from at least one rim cylinder. In particular, the press-fitting device is in the form of a web projecting radially outward. Thus, compared with the rim cylinder the press-fitting device can be made relatively narrow and/or delicate. Preferably, the width of the press-fitting device in the form of a lip and/or web in the axial direction of the joint and/or in the longitudinal direction of the inner sleeve is smaller or narrower than the width of the rim cylinder. The press-fitting device can surround the outer circumference of the inner sleeve and/or the rim cylinder in the manner of a ring. The press-fitting device can function as a retaining collar and/or it can be in the form of an in particular annular retaining collar. Preferably, the press-fitting device is made such that when the joint is pressed into a bearing eye the press-fitting device can be disregarded. Due to the pressing-in of the joint into a bearing eye, in particular of a vehicle component, the press-fitting device can be pressed flat by the outer sleeve and/or it can be pressed into the outer sleeve.

According to a further development, particularly in an assembled or fitted condition of the joint and in relation to a condition in which it is not fitted into a vehicle component and/or a bearing eye, the press-fitting device forms a gap between the outer sleeve and at least the rim cylinder associated with the press-fitting device.

Preferably, the press-fitting device is designed to perform a barbed hook function. In particular, the press-fitting device is designed to hold the inner sleeve in the outer sleeve before the joint is fitted into a vehicle component. Thus, by means of the press-fitting device the inner sleeve can be press-fitted into the outer sleeve. In particular, the firm seating of the inner sleeve in the outer sleeve when the joint has not yet been fitted into a vehicle component and/or bearing eye enables a sufficiently accurate and reproducible dimensioning of the joint, particularly the radial elasticity of the joint. Moreover, undesired noise emission particularly due to rattling of the inner sleeve can be avoided by virtue of the press-fitting of the inner sleeve into the outer sleeve.

Preferably, the locking ring or cover-plate is supported axially on the inner sleeve and/or on the joint socket, and/or it rests axially in contact with the inner sleeve and/or the joint socket. Preferably, particularly with a contact surface facing away from the locking ring or cover-plate, the inner sleeve rests on the outer sleeve. Thus, when the locking ring or cover-plate is pressed into the outer sleeve the inner sleeve can be axially prestressed relative to the outer sleeve. In that way the inner sleeve can be held fast in the outer sleeve, in particular by means of a single locking ring or cover-plate.

According to a further embodiment, in the area of the press-fitting device and/or the rim cylinder with the press-fitting device, compared with the rim cylinder remote from the press-fitting device the inner sleeve has a material-thickened and/or material-strengthened area directed radially inward. In particular, this area of thicker and/or stronger material enables high axial forces to be withstood, preferably in the axial preferred direction of the joint. The area of thickened and/or strengthened material is located in a region of the inner sleeve remote from the locking ring or cover-plate. On an inside of the inner sleeve the thickened and/or strengthened material can shaped as a ball, part of a ball and/or concave. In particular, the joint socket rests against the inside of the inner sleeve on an outside that corresponds with the inside of the inner sleeve. In particular, the area of thickened and/or strengthened material is formed solidly in such manner that a deformation of the press-fitting device due to the pressing of the joint into a bearing eye offers no hindrance and/or no impediment.

In a further development, the locking ring or the cover-plate and the inner sleeve with the integral press-fitting device are press-fitted into the outer sleeve. This ensures that the inner sleeve is held securely in the outer sleeve, particularly in the radial and/or axial direction.

Preferably, the joint is designed for a chassis component such that the chassis component is provided for fitting onto a chassis of a motor vehicle. In particular the joint is designed as a ball-and-socket joint in which the inner joint component can be in the form of a ball and the joint socket is a spherical shell. Alternatively, the joint can be a ball-stud joint with a ban stud as the inner part of the joint. In that case the ball-stud can comprise a joint ball and a stud portion connected to the joint ball. In particular the joint is designed as a press-in joint. The stud portion can for example be cylindrical or conical. The chassis component can be a control arm, a spring link, a wheel carrier and/or a suspension strut.

According to the method of the invention for producing a joint, in particular a joint according to the invention, an inner sleeve is fitted and/or pressed into an outer sleeve. A joint socket is arranged in the inner sleeve and in the joint socket an inner joint component can be fitted so that it can move. For the at least partial radial widening of the outer sleeve a preferably single locking ring or cover-plate can be press-fitted into the outer sleeve. In that way, in a condition of the joint before fitting, particularly in a bearing eye and/or a chassis component, a gap and/or free space can be produced between the inner sleeve and the outer sleeve, at least in the area of the locking ring or cover-plate. In particular, press-fitting the locking ring or cover-plate produces a gap and/or free space in the area of the rim cylinder, particularly that which is remote from the press-fitting device. Moreover, a press-fitting device arranged inside the outer sleeve as an integral part of the inner sleeve can be pressed into the outer sleeve for the at least partial radial widening of the outer sleeve. In that way a gap and/or free space can be produced between the inner sleeve and the outer sleeve in the area of the rim cylinder remote from the locking ring or cover-plate and/or associated with the press-fitting device.

In particular, the joint made in accordance with the invention is a joint of the invention as described earlier. Preferably, the method is developed further in accordance with all the design features explained herein for a joint according to the invention. Furthermore, the joint described here can be developed further in accordance with all the features explained in connection with the method.

Owing to the pressing-in on the one hand of the inner sleeve with the integrally made press-fitting device and the pressing-in on the other hand of the locking ring or cover-plate, an all-round free space and/or an annular gap between the inner sleeve and the outer sleeve can be provided or enlarged, in particular in the area of the two rim cylinders, at least in each case.

According to a further embodiment, the press-fitting device that extends radially in the direction of the outer sleeve is arranged in the area of a rim cylinder of the inner sleeve, particularly in the area of the rim cylinder remote from the locking ring or cover-plate. In particular, in the area of the rim cylinder associated with the press-fitting device, only the press-fitting device is brought into contact with the inside of the outer sleeve when the inner sleeve is pressed into the outer sleeve. In that way, by means of the press-fitting device the inner sleeve can be held fast in the outer sleeve when press-fitted into it. Preferably, when the inner sleeve is pressed into the outer sleeve the press-fitting device and the rim cylinder remote from the press-fitting device are brought into contact with an inside of the outer sleeve. In particular, when the inner sleeve is pressed into the outer sleeve the outer diameter of the inner sleeve in the area of the press-fitting device is larger than the inside diameter of the outer sleeve. Furthermore, when pressed into the outer sleeve the outer diameter of the inner sleeve can be larger than the inside diameter of the outer sleeve in the area of the rim cylinder.

By virtue of the press-fitting device a press fit or contact of the rim cylinder associated with the press-fitting device against the inside of the outer cylinder is avoided. When the inner sleeve is pressed into the outer sleeve the rim cylinder remote from the press-fitting device can come into contact with the inside of the outer sleeve. Due to a subsequent pressing-in of the locking ring or cover-plate into the outer sleeve, a press fit and/or contact of the rim cylinder remote from the press-fitting device between the inner sleeve and the inside of the outer sleeve can be loosened. For this, when pressed into the outer sleeve the locking ring or cover-plate can have an outer diameter which is larger than the outer diameter of the inner sleeve in the area of the rim cylinder. In particular, the outer diameter of the locking ring or cover-plate is larger than the inside diameter of the outer sleeve. Preferably, the outer diameter of the locking ring or cover-plate and the outer diameter of the inner sleeve in the area of the press-fitting device are identical. Preferably, the locking ring or cover-plate is arranged close to the rim cylinder remote from the press-fitting device.

In a further embodiment the inner sleeve with the press-fitting device is pressed into the outer cylinder first, followed by the locking ring or cover-plate. Preferably the locking ring is pressed into the outer sleeve, in particular in the axial direction, until it comes axially into contact with the inner sleeve. In particular, the locking, ring or cover-plate is in contact with the inner sleeve in the axial direction on a side remote from the press-fitting device.

Preferably, owing to the pressing-in of the inner sleeve and the locking ring or cover-plate, in each case a gap is formed between the rim cylinder a distance away in the axial direction of the inner sleeve and the outer sleeve. Thus, a first gap can be produced in the area of a first rim cylinder and a second gap in the area of a second rim cylinder.

Between the pressing-in of the inner sleeve and the pressing-in of the locking ring or cover-plate, the joint socket can be inserted, in particular press-fitted into the inner sleeve. After that, in particular before the locking ring or cover-plate is pressed in, the inner joint component can be fitted or arranged in the joint socket. Thus, the inner joint component is preferably fitted into the joint socket before the insertion and/or pressing-in of the joint socket into the inner sleeve.

After the inner sleeve and/or the locking ring or cover-plate have been pressed into the outer sleeve, the respectively associated axial end of the outer sleeve can be deformed radially inward, in particular bent or rolled over. In particular, after being so deformed the radial ends of the outer sleeve form axial stops for the locking ring or cover-plate and for the inner sleeve, hi particular a contact surface of the inner sleeve.

Preferably, particularly after the pressing of the locking ring or cover-plate into the outer sleeve and/or after the deformation of the axial ends, the joint is pressed into a bearing eye of a chassis component with a reduction of the diameter of the outer sleeve. During this, in particular the radial dimensions of the at least one free space and/or gap, preferably in the area of the rim cylinder, are reduced and/or bridged over. For example, due to the pressing of the outer sleeve into the bearing eye the diameter of the outer sleeve is reduced so much that it makes contact with the inner sleeve, hi particular in the area of the rim cylinder. In that way the press-fitting device can be at least partially deformed or pressed flat between the outer and inner sleeves, and/or pressed into the inside of the outer sleeve.

When the joint is pressed into the bearing eye of the chassis component, the diameter reduction of the outer sleeve has little or no effect on the radial prestressing of the mounting of the inner joint component. This remains true unless a further dimensional reduction of the outer sleeve influences the inner sleeve. However, until such influence the pressing-in force is essentially absorbed by the locking ring and the press-fitting device.

Furthermore, in an axially central area of the outer circumferential surface of the inner sleeve, specifically between the two rim cylinders, the recess and/or a free space can be present. In that case the recess and/or the free space can extend all round, like a groove, a cylinder and/or a ring. This can provide further possibilities for existing dimensional overlaps to have a less marked influence on the fitting of the inner joint component. If nevertheless there is a reduction of the diameter of the inner sleeve, or even if such becomes necessary due to a high loading of the joint, then the force is transferred essentially onto the axially outer regions, particularly by way of the rim cylinders, and to the joint socket.

The press-fitting device made integrally and as one piece with the inner sleeve can perform the function, in particular, of an additional or second locking ring or replace the function of an additional or second locking ring. Thus, the press-fitting device can have a dual function. On the one hand, by means of the press-fitting device the inner sleeve can be held fast in the radial and/or the axial direction. This can facilitate a reproducible dimensioning of the joint. On the other hand, by means of the press-fitting device a free space and/or a gap can be produced between the inner sleeve, in particular a rim cylinder of the inner sleeve associated with the press-fitting device, and the inside of the outer sleeve, for compensating a diameter reduction of the outer sleeve when the joint is pressed into a bearing eye.

BRIEF DESCRIPTION OF THE DRAWINGS

Below, the invention is explained in greater detail with reference to the figures, which show.

DETAILED DESCRIPTION OF THE PREFERRED EMBODIMENTS

Figure 1:
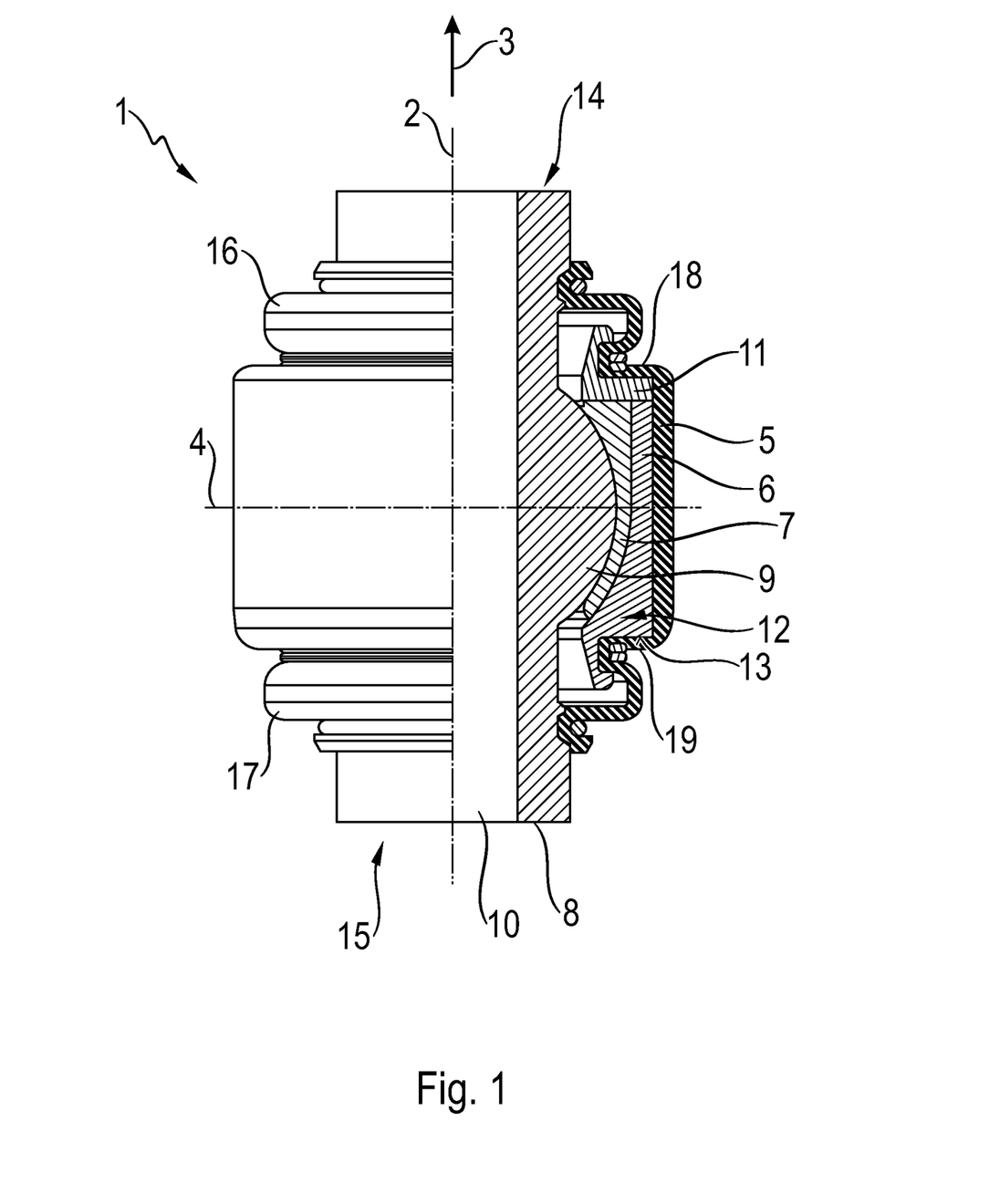
FIG. 1: A partially sectioned view of a first joint according to the invention.

FIG. 1 shows a partially sectioned view of a first joint 1 according to the invention. In this example embodiment the joint 1 is in the form of a cross-axis joint, namely a ball-and-socket joint. The joint 1 is designed rotationally symmetrically relative to a joint axis or longitudinal central axis 2. The joint axis or longitudinal central axis 2 extends in the axial direction of the joint 1 as shown by the arrow 3. In this representation, to the left of the longitudinal central axis 2 the joint 1 is shown as viewed from above, while in contrast, to the right of the longitudinal central axis 2 a longitudinal section through the joint 1 is shown. A transverse central axis 4 is arranged perpendicularly to the longitudinal central axis 2, so that the longitudinal central axis 2 and the transverse central axis 4 intersect at a mid-point of the joint 1.

An inner sleeve 6 is held in an outer sleeve 5. Inside the inner sleeve 6 a joint socket 7 is arranged. Inside the joint socket 7 an inner joint component 8 is fitted so that it can move. In this example embodiment the joint socket 7 is in the form of a spherical shell and the inner joint component 8 is in the form of a ball stud. The inner joint component 8 has a joint ball 9, which is fitted so that it can rotate and/or pivot relative to the joint socket 7. Through the inner joint component 8 a through-hole 10 extends in the axial direction 8. In this case, for example, the through-hole 10 is cylindrical. A locking ring 11 is pressed into the outer sleeve 5. The locking ring 11 rests axially against the joint socket 7 and the inner sleeve 6. In an area remote from the locking ring 11 or at an end of the inner sleeve 6 remote from the locking ring 11, the inner sleeve 6 has a zone of thickened or strengthened material 12 that extends radially inward. Here, "radial" is understood to mean a direction perpendicular to the axial direction shown by the arrow 3, or the longitudinal central axis 2. In the area of the thickened material 12 and on a side remote from the locking ring 11 the inner sleeve 6 has a supporting surface 13. The supporting surface 13 rests axially on the inside of the outer sleeve 5. In this example embodiment the outer sleeve 5 surrounds the inner sleeve 6 in the area of the thickened material 12.

The inner joint component 8 extends axially on both sides out of the outer sleeve 5 and in this case also axially through the locking ring 11 and the inner sleeve 6. At the axial ends 14 and 15 of the inner joint component 8 outside the outer sleeve 5 in each case a sealing bellows, 16 and 17 respectively, is attached. The sealing bellows 16 extends from the axial end 14 as far as the locking ring 11 and is attached thereto. The sealing bellows 17 extends from the axial end 15 as far as the inner sleeve 6 and is attached thereto. Furthermore, axial ends 18, 19 of the outer sleeve 5 are in each case bent radially inward so that the end 18 is axially in contact with the locking ring 11 and the end 19 is axially in contact with the supporting surface 13. Thus, the axial ends 18, 19 can also hold the locking ring 11 and the inner sleeve 6 fast in the outer sleeve 5 in an interlocked manner.

Figure 2:
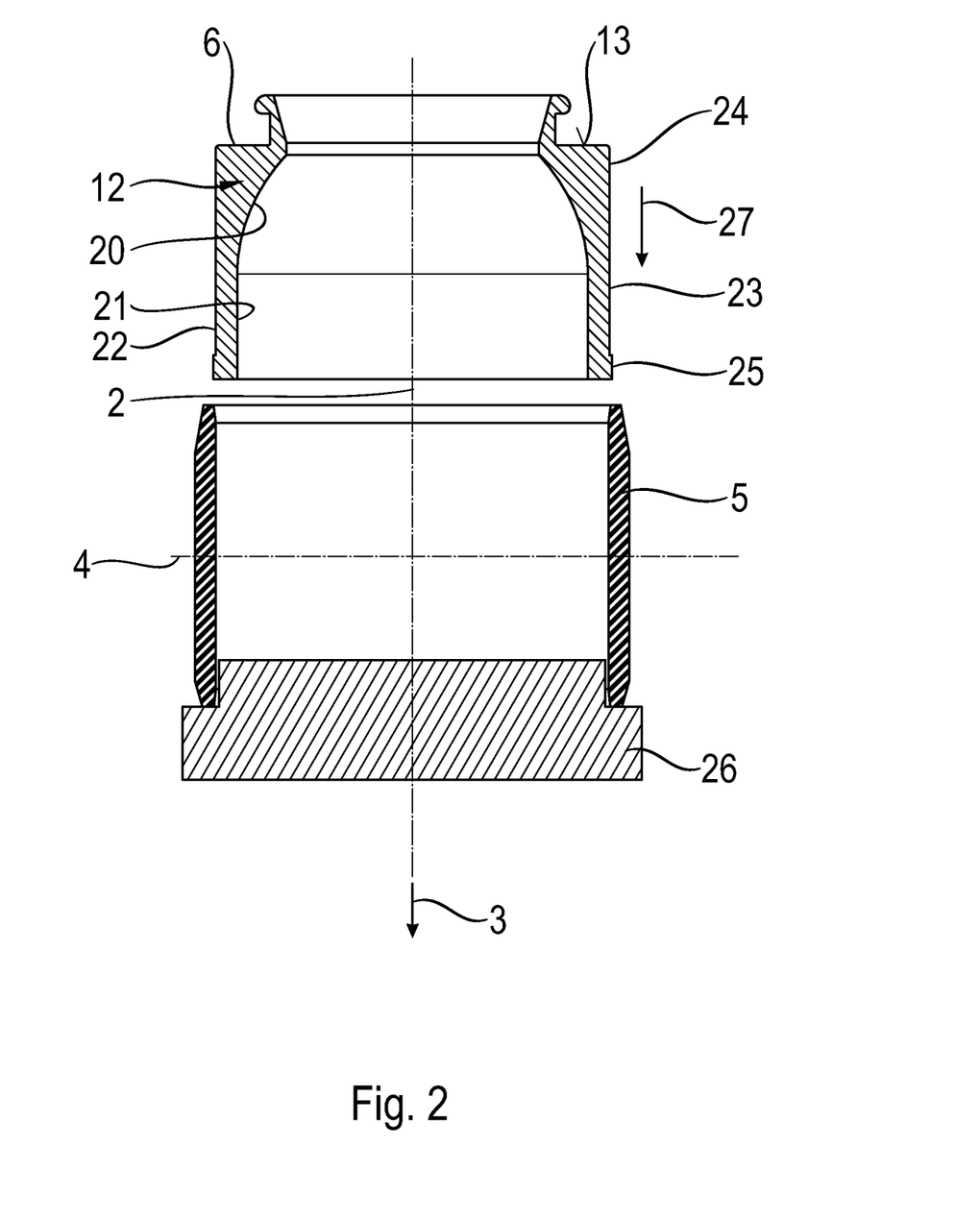
FIG. 2: A sectioned view of an outer sleeve and an inner sleeve before they are assembled with one another.

FIG. 2 shows a sectioned view of the outer sleeve 5 and the inner sleeve 6 before they are assembled with one another. In the area of the thickened material 12 the inner sleeve 6 has a concave and/or spherical section shaped inside region 20. In an area remote from the supporting surface 13 the inside region 20 of the outer sleeve 5 merges into an annular and/or cylindrical inside area 21. In an axially central area of an outer circumferential surface 22 of the inner sleeve 6 a coaxially extending recess 23 is formed, which is axially delimited on both sides. In this example embodiment the recess 23 is in the form of a groove. The axially separated edges of the inner sleeve $ in this example embodiment are in the form of rim cylinders 24, 25. The rim cylinders 24, 25 project radially outward beyond the recess 23. Thus, in the area of the two rim cylinders 24, 25 the inner sleeve 6 has a larger outer diameter than in the area of the recess.

Furthermore, in the area of the rim cylinders 24, 25 the outer diameter of the inner sleeve 6 is larger than the outer diameter of the outer sleeve 5. As shown in FIG. 2 and in FIGS. 3 to 5 to be described in greater detail below, various steps for the production of the joint 1 are illustrated. In FIG. 2 the outer sleeve 5 is placed on an assembly tool 26. Then, the inner sleeve 6 is pressed into the outer sleeve 5 in the direction of the arrow 3. The force required for this pressing-in is indicated by the arrow 27. Before the inner sleeve 6 is pressed into the outer sleeve 5, the outer diameter of the inner sleeve 6 is larger than the inside diameter of the outer sleeve 5, at least in the area of the rim cylinders 24, 25.

Figure 3:
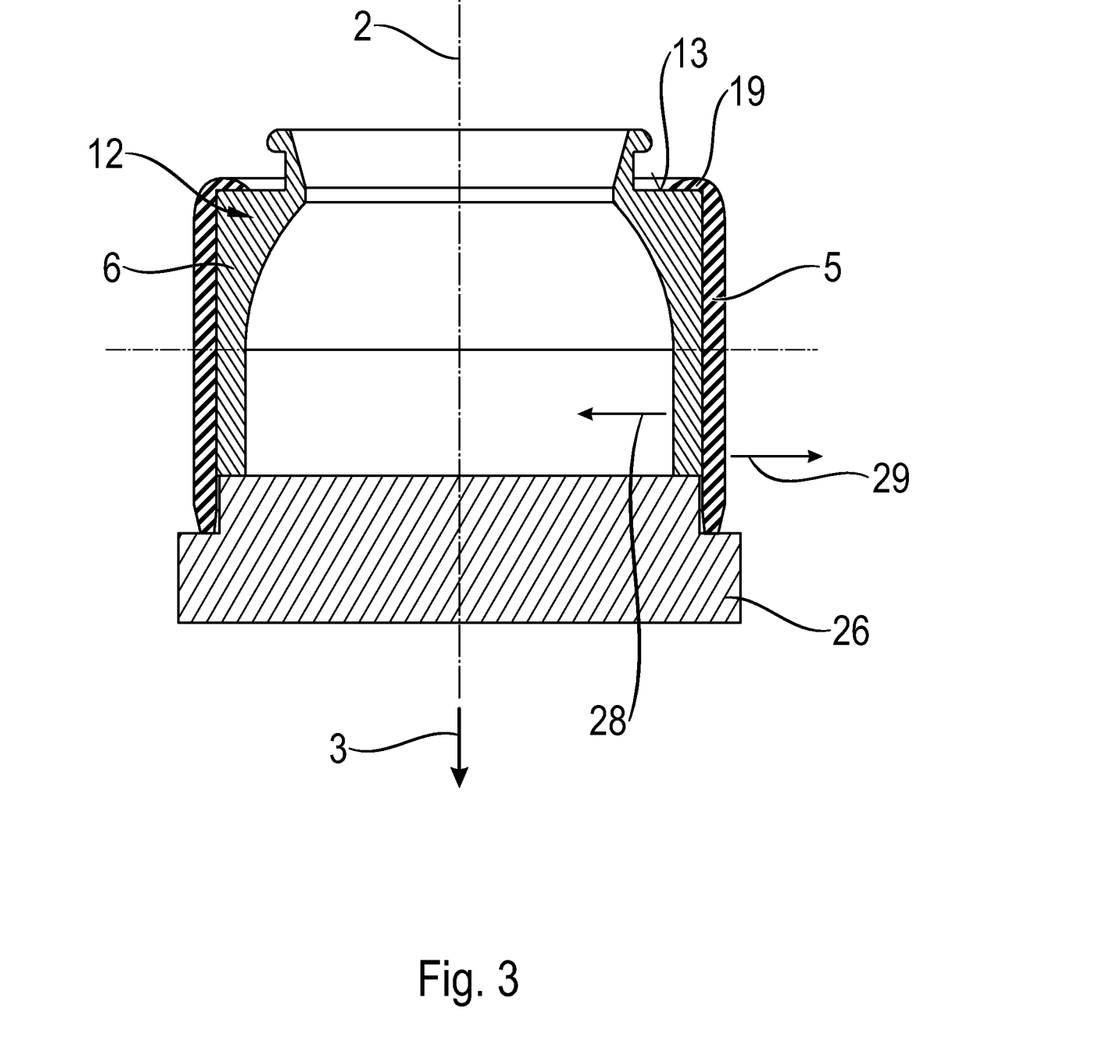
FIG. 3: A sectioned view of an outer sleeve with an inner sleeve fitted into it.

FIG. 3 shows a sectioned view of the outer sleeve 5 with an inner sleeve 6 fitted inside it. Here, the inner sleeve 6 has been press-fitted into the outer sleeve 5. During this pressing-in of the inner sleeve 6 into the outer sleeve 5, the diameter of the inner sleeve 6 has been reduced and the diameter of the outer sleeve 5 has been increased. These diameter changes are indicated by the arrows 28 and 29 respectively. It can also be seen that the axial end 19 of the outer sleeve 5 has been deformed radially inward so that the axial end 19 rests against the supporting surface 13 of the inner sleeve 6. In this example embodiment the radial end 19 of the outer sleeve 5 extends perpendicularly to the longitudinal central axis 12. Correspondingly, the supporting surface 13 extends in the radial direction, namely perpendicularly to the longitudinal central axis 2 in this example embodiment.

Figure 4:
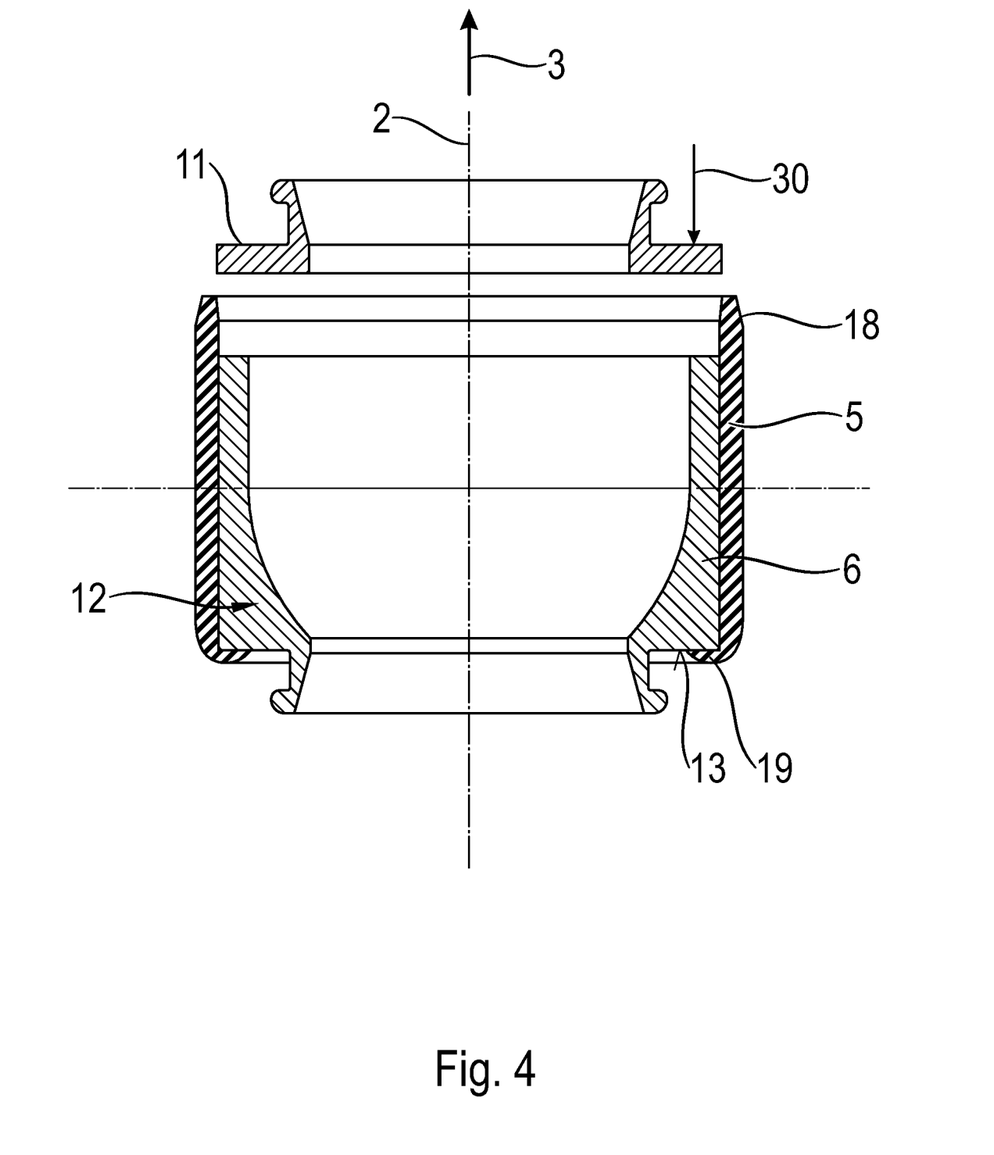
FIG. 4: A sectioned view of the outer sleeve with the inner sleeve fitted as in FIG. 3, before the fitting of a locking ring.

FIG. 4 shows a sectioned view of the outer sleeve 5 with the inner sleeve 6 fitted in accordance with FIG. 3, but before the fitting of the locking ring 11. The outer sleeve 5 with the pressed-in inner sleeve 6 has been taken off the assembly tool 26, in order then to press the locking ring 11 into the outer sleeve 5 in the direction opposite to the arrow 3 until the locking ring 11 comes axially into contact with the inner sleeve 6. FIG. 4 shows the situation before the locking ring 11 is pressed in, the force required for pressing it in being indicated by the arrow 30. The locking ring 11 is pressed in at an axial end 18 of the outer sleeve 5 remote from the thickened material 12 or the axial end 19.

As is evident from FIG. 4, for greater simplicity the joint socket 7 and the inner joint component 8 are not shown. Before the locking ring 11 is pressed in, the joint socket 7 and the inner joint component 8 are usually fitted into the inner sleeve 6. Only then is the locking ring 11 pressed into the outer sleeve 5. Thereby, with the help of the locking ring 11 the joint socket 7 is axially prestressed in the direction of the thickened material 12 of the inner sleeve 6.

Figure 5:
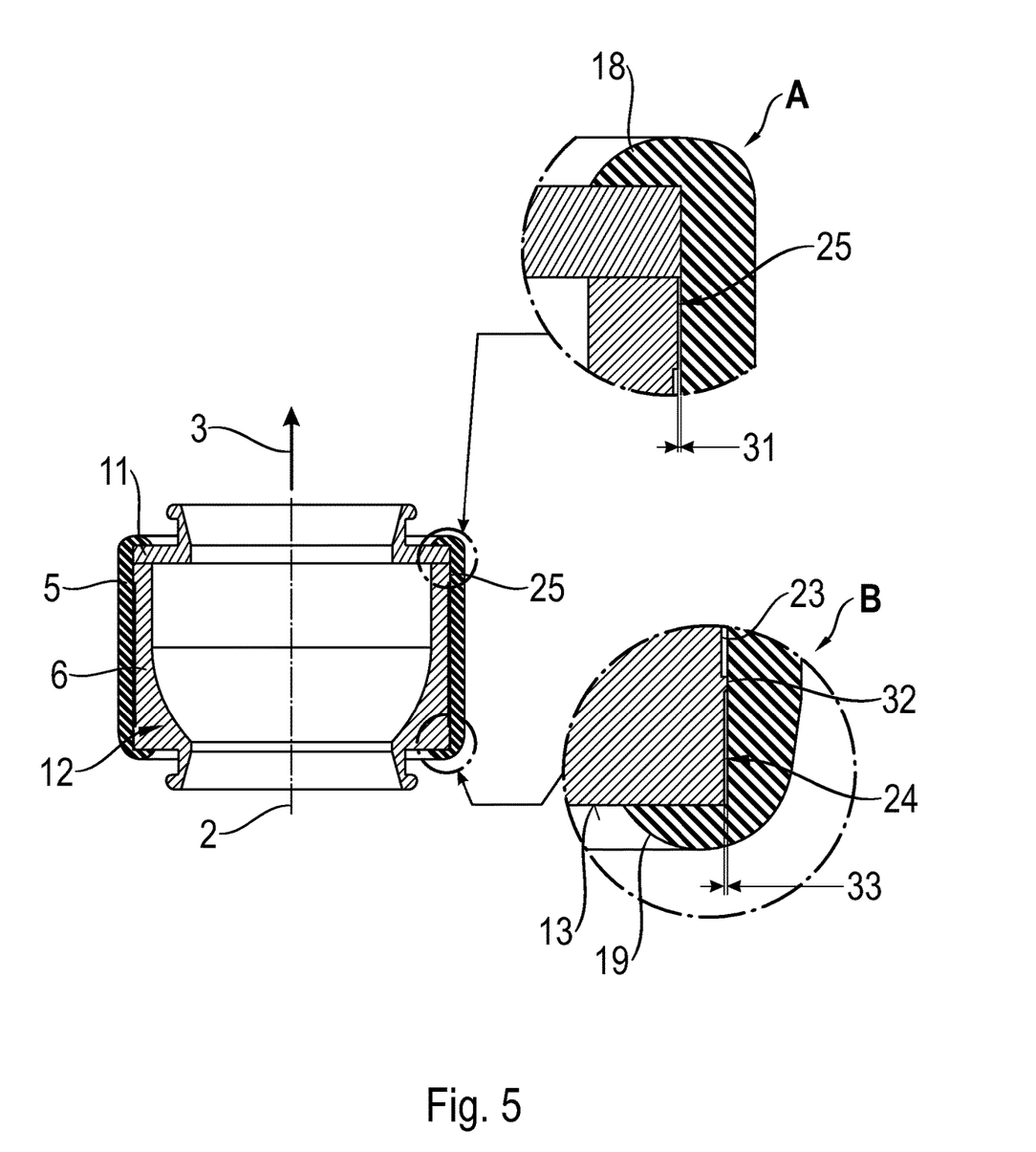
FIG. 5: A sectioned view of the outer sleeve with the inner sleeve fitted as in FIG. 3, and with a locking ring fitted.

FIG. 5 shows a sectioned view of the outer sleeve 5 with the inner sleeve 6 fitted in it as in FIG. 3 and the locking ring 11 fitted in it as well. In addition FIG. 5 shows two partial sections A and B, from which the pressed-in condition of the locking ring 11 is evident. Owing to the pressing in of the locking ring 11 its outer diameter has been reduced, and at least in the area of the rim cylinder 25 the outer diameter of the inner sleeve 5 has been increased. The diameter increase of the outer sleeve 5 caused by pressing in the locking ring 11 can also be regarded as a radial expansion. This radial expansion is large enough for the press-fit of the inner sleeve 6 in the area of the rim cylinder 25 to be loosened.

As shown in the part-section A, due to the pressing in of the locking ring 11 a free space or gap 31 is produced between the outer circumferential surface of the inner sleeve 6 in the area of the rim cylinder 25 and the inside of the outer sleeve 5.

After the locking ring 11 has been pressed in, the axial end 18 of the outer sleeve 5 is deformed radially inward. This holds the locking ring 11 fast in the axial direction along the arrow 3, between the axial end 18 and the inner sleeve 6.

The partial-section B shows a press-fitting device 32. The press-fitting device 32 is an integral or same-piece part of the inner sleeve 6. In this example embodiment the press-fitting device 32 is in the form of an annular web extending all round the outer periphery of the inner sleeve 6. The press-fitting device 32 extends radially outward. The outer diameter of the press-fitting device 32 is larger than the outer diameter of the inner sleeve 6 in the area of the rim cylinder 24, so that the press-fitting device 32 projects radially outward beyond the rim cylinders 24, 25. Furthermore, in this example embodiment the press-fitting device 32 is positioned in the area of an edge of the rim cylinder 25. Moreover, in this example the press-fitting device 32 is located in the area of an inward-directed edge of the rim cylinder 24.

By means of the press-fitting device 32 the inner sleeve 6 is press-fitted into the outer sleeve 5 in a fixed position, particularly in the radial direction, in the area of the rim cylinder 24. Compared with the rim cylinder 24 the press-fitting device 32 is made comparatively narrow. Owing to the press-fitting device 32 a free space or gap 33 is formed in the area of the rim cylinder 24 between the outer peripheral surface of the inner sleeve 6 and the inside of the outer sleeve 5.

In this example embodiment the press-fitting device 32 has the contour of a barbed hook. This can further reduce the risk of any undesired loosening of the inner sleeve 6 in the axial direction.

The gaps 31, 33 and the recess 23 form annular free spaces between the inner sleeve 6 and the outer sleeve 5. In this example embodiment the locking ring 11 and the press-fitting device 32 are size-matched to one another in such manner that the widths of the gaps 31, 33 are identical, or at least substantially the same size.

Figure 6:
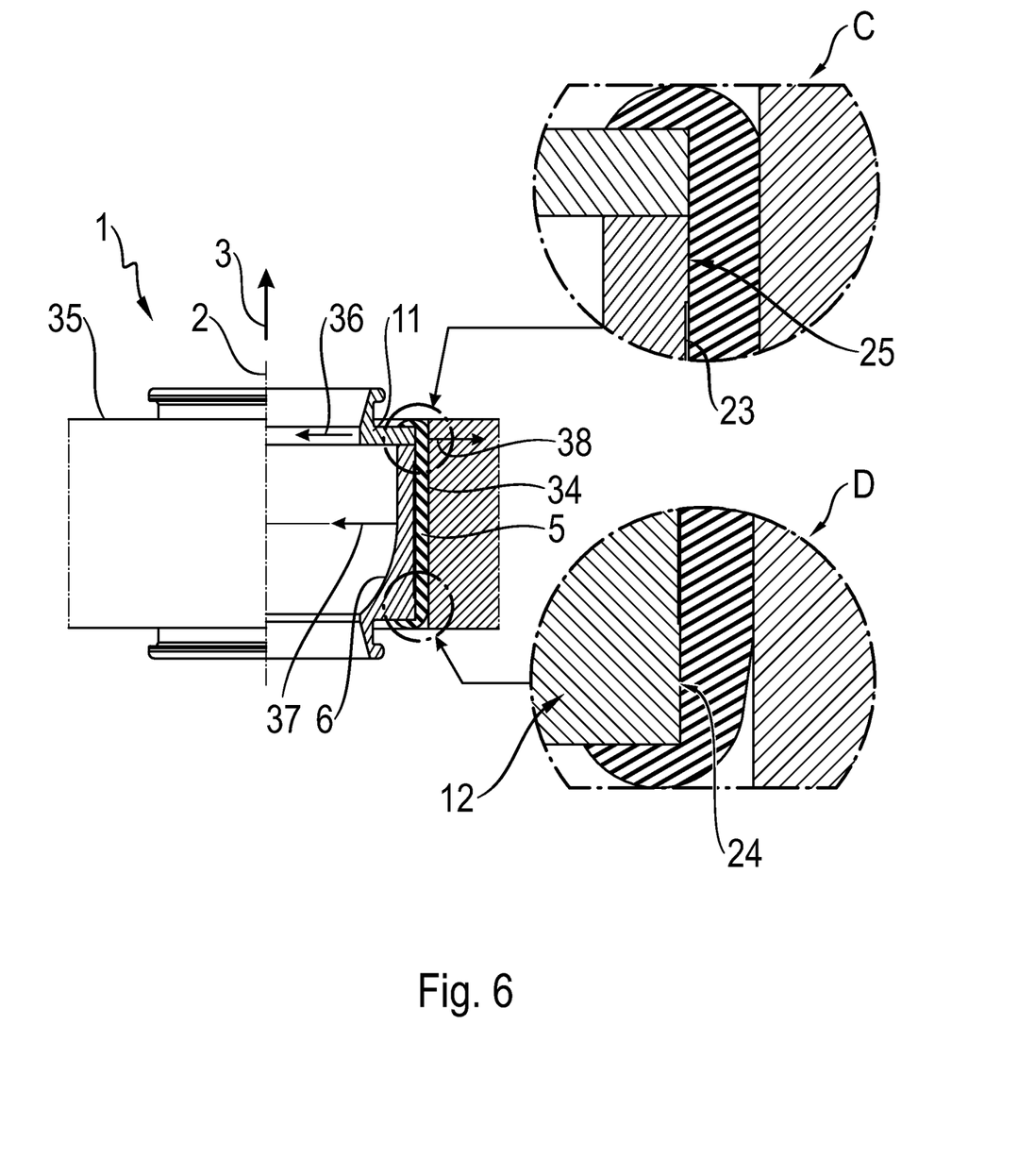
FIG. 6: A partially sectioned view of a first joint according to the invention, as in FIG. 1, after pressing into a bearing eye.

FIG. 6 shows a partially sectioned view of the joint 1 of the invention according to FIG. 1, after it has been pressed into a bearing eye 34. For simplicity the joint socket 7 and the inner joint component 8 have been omitted from this representation. In addition two part-sections C and D are shown. The bearing eye 34 is part of a chassis component 35. In this example embodiment the chassis component 35 is in the form of a control arm. To the left of the longitudinal central axis 2 part of the chassis component 35 as seen from above is shown, whereas to the right of the longitudinal central axis 2 part of the chassis component 35 is shown in section.

In this example embodiment the bearing eye is in the form of a cylindrical through-hole is the chassis component 35. Owing to the pressing of the joint 1 with its outer sleeve 5 into the bearing eye 34, the diameters of the outer sleeve 5, the locking ring 11 and the inner sleeve 6 have been reduced. In addition, owing to the pressing-in, the diameter of the bearing eye 34 has been increased. The respective diameter enlargement and diameter reductions are indicated by the arrows 36, 37 and 38.

As shown by the part-sections C and D, due to the diameter reduction of the outer sleeve 5 the gap 31 and the gap 33 have disappeared, i.e. the associated free spaces have been bridged. However, the recess 3 between the two rim cylinders 24, 25 is still present. Thus, the forces transmitted from the outer sleeve 5 into the inner sleeve 6 can essentially pass through the rim cylinders 24, 25 and onward. A diameter reduction of the inner sleeve 6 results in an increase of the radial prestressing of the joint socket 7, such that as viewed in the axial direction 3 the radial forces exerted by the joint socket 7 on the joint ball 9, in particular at the level of the rim cylinders 24, 25, are at their largest. Moreover, owing to the thickened material 12, the joint 1 can absorb higher loads or forces in an axial preferred direction. In this example embodiment the axial preferred direction for absorbing axial loads or forces is opposite to the axial direction represented by the arrow 3.

When the joint 1 is pressed into the bearing eye 34, owing to the diameter reduction of the outer sleeve 5 the pies-fitting device 32 is deformed, reshaped and/or distorted in such manner that in the area of the press-fitting device 32 or rim cylinder 24 the outer sleeve 5 comes in contact with the outer circumferential surface of the inner sleeve 6. During this the material of the press-fitting device 32 is pressed and/or deformed into the outer sleeve 5 and/or in the direction toward the recess 23. The thickened material 12 then serves as a kind of counter-block for the deformation or reshaping of the press-fitting device 32 when the joint 1 or its outer sleeve 5 is pressed into the bearing eye 34.

Figure 7:
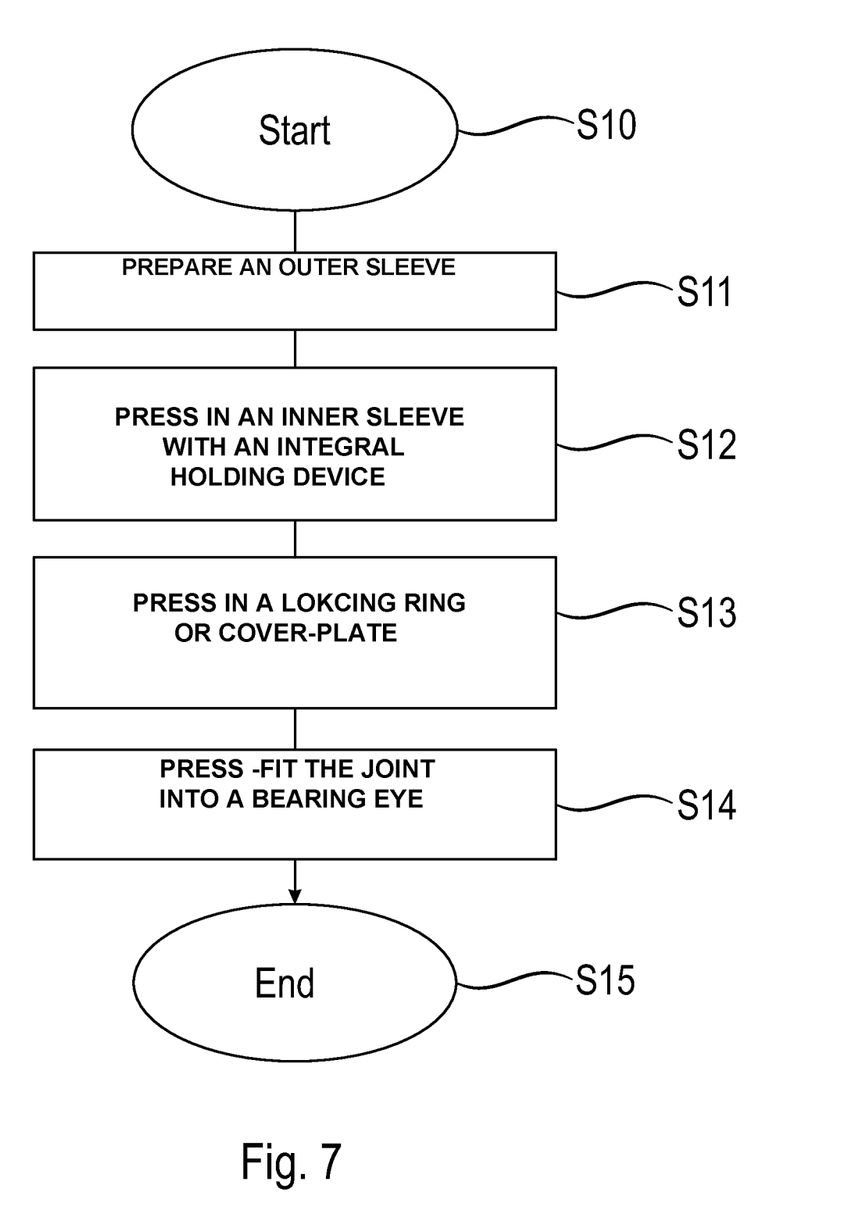
FIG. 7: A schematic flow chart for a method according to the invention.

FIG. 7 shows a schematic flow chart for a method according to the invention. After the start of the method according to the invention in step S10, in step 311 an outer sleeve 5 is prepared. For this, the outer sleeve 5 is fitted into an assembly tool 26. Then, in step S12 the inner sleeve 6 is pressed into the outer sleeve 5. The inner sleeve 6 has a press-fitting device 32 formed integrally or in one piece with the inner sleeve 6. Before the inner sleeve 6 is pressed into the outer sleeve 5, in the area of the rim cylinders 24, 25 and the press-fitting device 32 the inner sleeve 6 has an outer diameter which is larger than the inside diameter of the outer sleeve 5. Moreover, the outer diameter of the press-fitting device 32 is larger than the outer diameter of the two rim cylinders 24, 25. Thus, by virtue of the pressing-in of the inner sleeve 6 a press-fit of the inner sleeve 6 in the outer sleeve 5 is formed. In this press-fit the press-fitting device 32 and the rim cylinder 25 remote from the press-fitting device 32 are in contact with the inside of the outer sleeve 5.

After that, in step 313 the locking ring 11 is pressed into the outer sleeve 5. In this case the locking ring 11 is pressed in immediately adjacent or next to the rim cylinder 25. Before the locking ring 11 has been pressed in, it has an outer diameter larger than the inside diameter of the outer sleeve 5. Because of that, when the locking ring 11 is pressed into the outer sleeve 5 the press-fit of the rim cylinder 25 is loosened. Thus, by virtue of the locking ring 11 a gap 31 is formed in the area of the rim cylinder 25 and by virtue of the press-fitting device 32 a gap 33 is formed in the area of the rim cylinder 24. As is made evident by referring to FIG. 8 described below, alternatively to and instead of a locking ring 11 a cover-plate can be used if instead of a ball-and-socket joint, the joint is a ball stud joint.

Thereafter, in step S14 the joint 1 is pressed into a bearing eye 34. Due to this pressing-in the diameter of the outer sleeve 5 is reduced and the free spaces provided by the gaps 31, 33 are closed. Thus, after the joint 1 has been pressed into the bearing eye 34 the outer circumferential surfaces of the rim cylinders 24, 25 are in contact with the inside of the outer sleeve 5. Then, in step S15 the method according to the invention ends.

In an alternative embodiment the method for producing the joint 1 according to the invention can already be ended after step S13. In a further alternative embodiment the axial edge 19 of the outer sleeve 5 can be deformed radially inward after carrying out step S12 but before carrying out step S13. Furthermore, after the locking ring 11 has been press-fitted in step S13 but before step S14 and the end of the process, the axial end 18 of the outer sleeve 5 can be deformed radially inward. Owing to the deformation of the axial ends 18, 19, the inner sleeve 6 and/or the joint socket 7 is held fast and/or prestressed in the axial direction.

Hg, 8 shows a partially sectioned view of a further joint 39 according to the invention. As before, functionally equivalent components are given the same indexes as in FIGS. 1 to 6. In this example embodiment the joint 39 is in the form of a stud joint, i.e. a ball stud joint. The joint 39 is designed rotationally symmetrically relative to a joint central axis or longitudinal central axis 2. The joint axis or longitudinal central axis 2 extends in the axial direction of the joint 39 as indicated by the arrow 3. In this representation, to the left of the longitudinal central axis 2 the joint 39 is shown as viewed from above, whereas to the right of the longitudinal central axis 2 a longitudinal section through the joint 39 is shown. A transverse central axis 4 is arranged perpendicularly to the longitudinal central axis 2; and the longitudinal central axis 2 and the transverse central axis 4 intersect at a mid-point of the joint 39.

Figure 8:
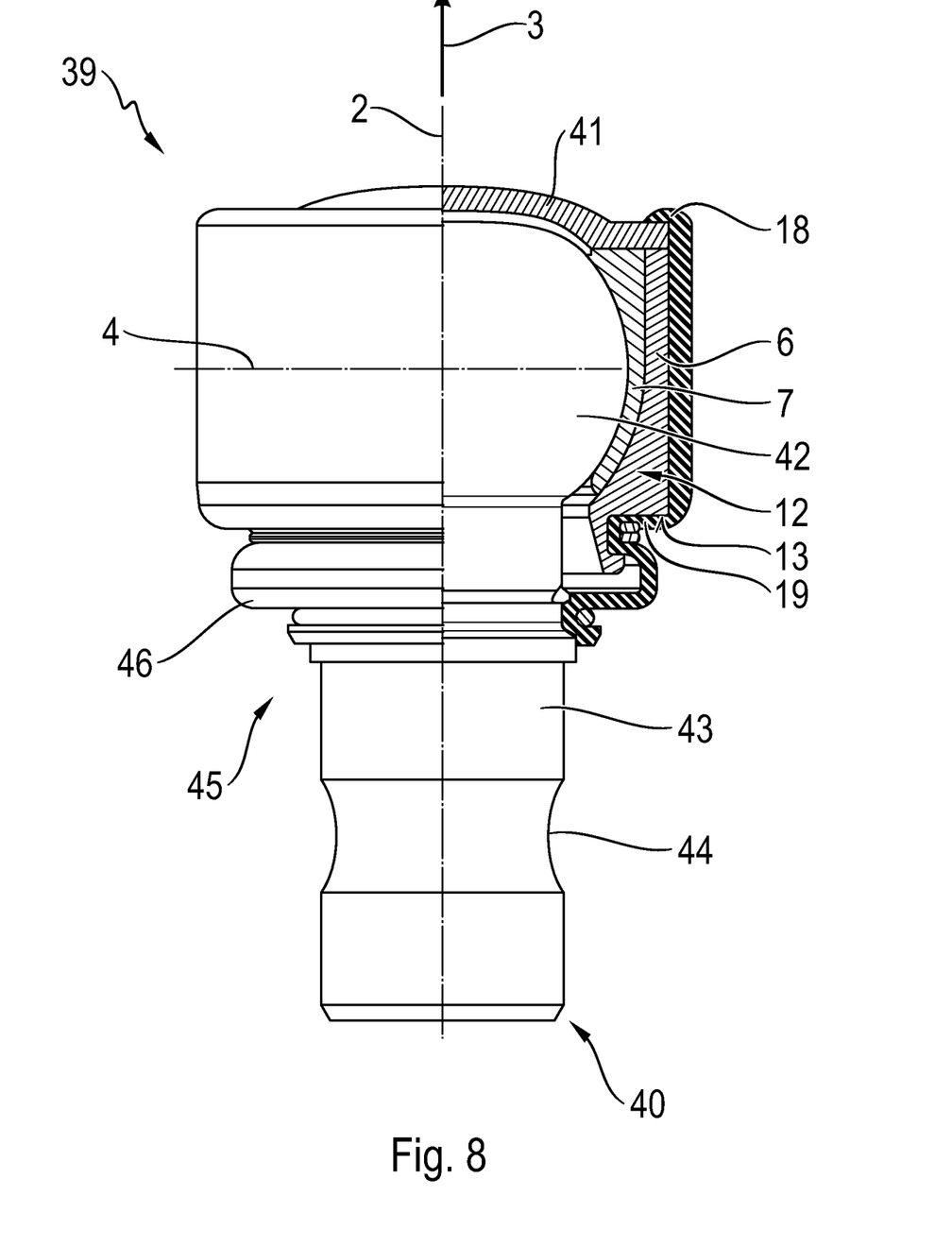
FIG. 8: A partially sectioned view of a second joint according to the invention.

An inner sleeve 6 is inserted into an outer sleeve 5. Inside the inner sleeve $ is arranged a joint socket 7. Inside the joint socket 7 an inner joint component 40 is fitted and able to move. In this example embodiment the joint socket 7 is in the form of a spherical shell and the inner joint component 40 is a ball stud. The inner joint component 40 has a joint ball 42 which is fitted so that it can rotate and/or pivot relative to the joint socket 7.

Into the outer sleeve 5 is pressed a cover-plate 41. The cover-plate 41 rests axially against the joint socket 7 and the inner sleeve 6. In this example embodiment the cover-plate 41 is domed radially outward. In an area remote from the cover-plate 41 the inner joint component 40 has a stud section 43. The stud section 43 is connected to the joint ball 42. In this example embodiment the stud section 43 is essentially of cylindrical form. Alternatively, the stud section 43 can for example be of conical shape. Furthermore, in this design example the stud section 43 has an all-round groove 44.

In an area remote from the cover-plate 41 or at an end of the inner sleeve 6 remote from the cover-plate 41, the inner sleeve 6 has an inward-extending section of thicker or stronger material 12. In the area of the thicker material 12 and on a side facing away from the cover-plate 41, the inner sleeve 6 has a supporting surface 13. The supporting surface 13 is axially in contact with the inside of the outer sleeve 5. In this example embodiment the outer sleeve 5 surrounds the inner sleeve 6 in the area of the thickened material 12.

By virtue of the stud section 43 the inner joint component 40 extends axially out of the outer sleeve 5 and through the inner sleeve 6 on the side remote from the cover-plate 41. At an axial end 45 of the outer sleeve 5 remote from the cover-plate 41 a sealing bellows 46 is attached. The sealing bellows 46 extends from an outer circumference of the stud section 43 to the inner sleeve 6, to which it is attached.

Furthermore, axial ends 18, 19 of the outer sleeve 5 are in each case bent radially inward so that the end 18 rests axially against the cover-plate 41 and the end 19 axially against the supporting surface 13. Thus, the axial ends 18, 19 can also hold the cover-plate 41 and the inner sleeve 6 fast in the outer sleeve 5 in a form-enclosing manner.

The production or assembly of the joint 39 takes place analogously to the description relating to the joint 1 illustrated in FIGS. 2 to 7. Thus, the joint 39 too comprises a press-fitting device 32. In that respect reference is made to the description given earlier, except in that instead of the locking ring 11 a cover-plate 41 is used in the joint 39.

INDEXES

1 Joint
2 Longitudinal central axis
3 Arrow, axial direction
4 Transverse central axis
5 Outer sleeve
6 inner sleeve
7 Joint socket
8 Inner joint component
9 Joint ball
10 Through-hole
11 Locking ring
12 Thickened material
13 Supporting surface
14 End of the inner joint component
15 End of the inner joint component
16 Sealing bellows
17 Sealing bellows
18 End of the outer sleeve
19 End of the outer sleeve
20 Inside area
21 Inside area
22 Outer circumferential surface
23 Recess
24 Rim cylinder
25 Rim cylinder
26 Assembly too
27 Arrow, force
28 Arrow, diameter reduction
29 Arrow, diameter increase
30 Arrow, force
31 Gap
32 Press-fitting device
33 Gap
34 Bearing eye
35 Chassis component
36 Arrow, diameter reduction
37 Arrow, diameter reduction
38 Arrow, diameter increase
39 Joint
40 Inner joint component
41 Cover-plate
42 Joint ball
43 Stud section
44 Groove
45 End
46 Sealing bellows
A Partial section
B Partial section
C Partial section
D Partial section

The invention claimed is:

1. A joint for a vehicle comprising:
an outer sleeve;
a joint socket for holding an inner joint component fitted so that the inner joint component is movable;
an inner sleeve being arranged at least partially between the joint socket and the outer sleeve such that the inner sleeve has two rim cylinders an axial distance apart from one another on an outer circumference of the inner sleeve which project radially outward and the two rim cylinders delimit an all-round recess on the outer circumference of the inner sleeve; and
a press-fitting device, being formed integrally with the inner sleeve in an area of at least one rim cylinder of the inner sleeve, extending radially outward beyond the outer diameter of the at least one rim cylinder.

2. The joint according to claim 1, wherein starting from an outer circumference of the at least one rim cylinder of the inner sleeve, the press-fitting device extends radially outward and contacts the outer sleeve.

3. The joint according to claim 1, wherein either a locking ring or a cover-plate is arranged inside the outer sleeve, and the press-fitting device is associated with the at least one rim cylinder remote from the locking ring or the cover-plate.

4. The joint according to claim 1, wherein the press-fitting device is in a form of a lip of the at least one rim cylinder.

5. The joint according to claim 1, wherein in an assembled condition of the joint and before the joint is fitted into a chassis component, the press-fitting device creates a gap between the outer sleeve and the at least one rim cylinder.

6. The joint according to claim 1, wherein the press-fitting device comprises a barbed-hook and/or holds the inner sleeve inside the outer sleeve before the joint is fitted into a chassis component.

7. The joint according to claim 1, wherein the inner sleeve has a zone of at least one of thickened and strengthened material, directed radially inward in an area of at least one of the press-fitting device, compared with the other rim cylinder remote from the press-fitting device.

8. The joint according to claim 1, wherein either a locking ring or a cover-plate and the inner sleeve are press-fitted into the outer sleeve.

9. The joint according to claim 1, further comprising a structure for a chassis component for fitting into a chassis of a motor vehicle, as either a ball-and-socket joint or a ball joint with either a ball stud or a ball socket as the inner joint component and a ball socket as the joint socket.

10. A method for producing a joint for a vehicle, the joint having an outer sleeve, a joint socket for holding an inner joint component fitted so that the inner joint component is movable, an inner sleeve arranged at least partially between the joint socket and the outer sleeve, such that the Inner sleeve has two rim cylinders axial spaced apart from one another on an outer circumference of the inner sleeve which project radially outward and the two rim cylinders delimit an all-round recess on the outer circumference of the inner sleeve, and a press-fitting device is formed integrally with the inner sleeve, in an area of at least one rim cylinder, and extends radially outward beyond an outer diameter of the at least one rim cylinder, the method comprising:

fitting the inner sleeve into the outer sleeve;

arranging the joint socket in the inner sleeve;

fitting the inner joint component to move within the joint socket; and     arranging the press-fitting device inside the outer sleeve as an integral part of the inner sleeve and pressing the press-fitting device into the outer sleeve in order to expand the outer sleeve radially, at least in part.

11. The method according to claim 10, further comprising arranging the pressing-in device, that extends radially in a direction toward the outer sleeve, in the area of the at least one rim cylinder of the inner sleeve, and when the inner sleeve is pressed into the outer sleeve, in the area of the at least one rim cylinder only bringing the pressing-in device into contact with an inside of the outer sleeve.

12. The method according to claim 10, further comprising pressing the inner sleeve with the pressing-in device into the outer sleeve, followed by arranging either a locking ring or a cover-plate inside the outer sleeve so that, by way of either the locking ring or the cover-plate, the outer sleeve is expanded radially, at least In part.

13. The method according to claim 10, further comprising due to the pressing in of the inner sleeve and the locking ring or the cover-plate, in each case forming a gap between the rim cylinders spaced apart from one another in an axial direction and the outer sleeve.

14. The method according to claim 13, further comprising after the inner sleeve and the locking ring or the cover-plate are pressed In, pressing the outer sleeve into a bearing eye of a chassis component, whereby the two rim cylinders of the inner sleeve come Into contact with and/or are pressed against an inside of the outer sleeve.

15. A joint for a vehicle, the joint comprising;

an outer sleeve, a joint socket which holds an inner joint component such that the inner joint component is movable,     an inner sleeve being arranged at least partially between the joint socket and the outer sleeve,     the inner sleeve having first and second rim cylinders located on an outer circumference of the inner sleeve which project radially outward and are axially spaced from one another, and the first and the second rim cylinders delimit an all-round recess on the outer circumference of the inner sleeve, and     a press-fitting device, formed integrally with the inner sleeve in an area of the first rim cylinder of the inner sleeve, extends radially outward beyond an outer diameter of the first rim cylinder.

\* \* \* \* \*